(12) United States Patent
Reck

(10) Patent No.: US 8,770,223 B2
(45) Date of Patent: Jul. 8, 2014

(54) PURGE/FILL VALVE WITH A MAIN VALVE PORTION ALIGNED WITH A TEE

(75) Inventor: Michael E. Reck, Worcester, MA (US)

(73) Assignee: Webstone Company, Inc., Worcester, MA (US)

( * ) Notice: Subject to any disclaimer, the term of this patent is extended or adjusted under 35 U.S.C. 154(b) by 214 days.

(21) Appl. No.: 12/615,547

(22) Filed: Nov. 10, 2009

(65) Prior Publication Data

US 2010/0059128 A1    Mar. 11, 2010

Related U.S. Application Data

(63) Continuation-in-part of application No. 11/929,002, filed on Oct. 30, 2007, which is a continuation-in-part of application No. 11/648,376, filed on Dec. 29, 2006, now abandoned.

(60) Provisional application No. 60/756,007, filed on Jan. 4, 2006.

(51) Int. Cl.
| | |
|---|---|
| *F16K 11/22* | (2006.01) |
| *F16K 24/02* | (2006.01) |
| *F16K 5/06* | (2006.01) |

(52) U.S. Cl.
CPC ............ *F16K 5/0605* (2013.01); *F16K 24/02* (2013.01)
USPC ...................... 137/597; 137/876; 251/315.06

(58) Field of Classification Search
USPC .................. 137/861, 864, 872, 875, 876, 597; 251/315.01, 315.06
See application file for complete search history.

(56) References Cited

U.S. PATENT DOCUMENTS

| | | | |
|---|---|---|---|
| 1,350,362 A |   | 8/1920 | Decker |
| 2,169,043 A | * | 8/1939 | Goehring ................. 137/599.11 |
| 2,441,483 A | * | 5/1948 | Goehring ....................... 137/597 |
| 2,835,234 A |   | 5/1958 | Rasch et al. |
| 3,460,566 A |   | 8/1969 | Heartstedt et al. |
| 3,473,554 A |   | 10/1969 | King |
| 3,591,131 A |   | 7/1971 | Carlson |
| 3,627,203 A |   | 12/1971 | Martin |
| 3,674,052 A |   | 7/1972 | Hartman et al. |
| 3,770,016 A |   | 11/1973 | Johnstone et al. |
| 4,089,345 A |   | 5/1978 | Eberhardt |
| 4,103,868 A |   | 8/1978 | Thompson |
| 4,206,904 A |   | 6/1980 | Dante |

(Continued)

FOREIGN PATENT DOCUMENTS

WO    WO 2005031200 A1 *    4/2005    ........... F16K 11/087

*Primary Examiner* — William McCalister
(74) *Attorney, Agent, or Firm* — Mark S. Leonardo; Brown Rudnick LLP

(57) ABSTRACT

A purge valve comprising a valve body having a first primary loop port, a second primary loop port, a first secondary loop port and a second secondary loop port is provided. The secondary loop ports are disposed at respective ends or a linear secondary loop portion of the valve body. A primary loop portion of the valve body is formed by a pair of closely spaced tees extending from the secondary loop portion. At least one main valve portion is disposed in a first one of the tees. A drain/venting valve portion extends from the main valve portion. A portion of the secondary loop portion between the tees is shared with the primary loop portion in which flow in a primary loop and a secondary loop are hydraulically separated. A second drain/venting valve portion may be provided in a second one of the tees.

6 Claims, 11 Drawing Sheets

(56) References Cited

U.S. PATENT DOCUMENTS

| | | |
|---|---|---|
| 4,291,689 A | 9/1981 | Hay |
| 4,342,444 A | 8/1982 | Sonderman |
| 4,479,459 A | 10/1984 | Piper |
| 4,711,268 A | 12/1987 | Coleman |
| 4,718,444 A | 1/1988 | Boelte |
| 4,879,912 A | 11/1989 | Suckow |
| 5,152,502 A | 10/1992 | Randall et al. |
| 5,551,479 A | 9/1996 | Graves |
| 5,586,449 A | 12/1996 | Krist |
| 5,632,300 A | 5/1997 | Isringhausen |
| 5,762,100 A | 6/1998 | Wilda et al. |
| 5,857,717 A | 1/1999 | Caffrey |
| 6,296,229 B1 | 10/2001 | Giacomini |
| 6,347,644 B1 | 2/2002 | Channell |
| 6,357,477 B1 | 3/2002 | Walcott et al. |
| 6,655,412 B2 | 12/2003 | Reck |
| 2007/0169827 A1 | 7/2007 | Reck |
| 2007/0181194 A1 | 8/2007 | Honzelka et al. |
| 2008/0087340 A1 | 4/2008 | Reck |
| 2008/0142104 A1 | 6/2008 | Reck |

\* cited by examiner

PURGE/FILL VALVE WITH A MAIN VALVE PORTION ALIGNED WITH A TEE

CROSS REFERENCE TO RELATED APPLICATIONS

This is a continuation in part (CIP) of U.S. patent application Ser. No. 11/929,002 filed on Oct. 30, 2007 which is a CIP of U.S. patent application Ser. No. 11/648,376 filed on Dec. 29, 2006 which claims the benefit of U.S. Provisional Patent Application No. 60/756,007, filed on Jan. 4, 2006, the contents of which being incorporated herein by reference in its entirety.

FIELD OF INVENTION

The present invention relates to valves, particularly to a primary/secondary loop purge valves.

BACKGROUND OF INVENTION

Primary/secondary ("P/S") piping systems are used to isolate the pressure differential established by a pump from those established by other pumps in the same system. P/S piping allows any pump in the system to operate with virtually no tendency to induce flow, or even disturb flow, in other loops. P/S piping systems have become increasingly popular in many commercial and residential plumbing systems, such as hydronic heating and cooling systems. In such systems purge valves are essential to the operation and maintenance of the systems. Hydronic heating systems have gained popularity due to the comfortable average temperature they provide uniformity in heating. Hydronic systems use water, or water-based solutions, to move thermal energy from where it is produced to where it is needed. Thermal energy is absorbed by the water at a heat source, conveyed by the water through the distribution piping, and finally released into a heated space by a heat emitter. Because hydronic heating and cooling systems rely on the flow of water through the pipes, the presence of air bubbles or pockets within the piping can lead to inefficiency and malfunction of the system. Purge valves are used to empty the system of air upon installation and during maintenance to provide for a more efficient system. Previous systems utilized purge valves located on the secondary loop in order to remove air from the secondary loop. The use of such valves can lead to pressure differentials that can affect the operation of the remainder of the system.

Hydronic systems utilize a liquid fluid to shift energy (i.e. BTUs) from one location to another. Typically this is accomplished by heating up (or in cooling applications, cooling) a liquid, such as water, or a mixture of water and other fluids (such as glycol antifreeze) to elevate the boiling point and lower the freezing point, and pumping the liquid to another location where the captured energy in the fluid is released. The hydronic solution can be heated through the use of a boiler, solar energy, geothermal pump, or any other means. The hydronic solution can be cooled by use of a heat pump, geothermal pump, or other such means of cooling the solution.

Hydronic systems require periodic maintenance, either to replace the water in the system or to replace a mixture of water and antifreeze, to de-scaling the heat exchangers or to flush out sludge, etc. This is accomplished by draining the hydronic system, flushing with a de-scaling and/or cleaning solution, draining and filling the system back up with new fluid. Historically, purging a typical hydronic system has been accomplished by plumbing an assembly consisting of a boiler drain connected to a check valve and connected to another boiler drain. This method, while functional, is far from ideal. There are several connections as part of the assembly which each provide a potential leak path. Further, disadvantageously, the check valve typically does not provide for complete shutoff and during normal operation of the system the check valve offers some internal flow restriction.

SUMMARY OF INVENTION

A P/S loop purge valve that allows for the elimination of air from a piping system with no discernable pressure decrease is disclosed. The valve allows for power purging off a secondary loop in the installation of hydronic systems. An embodiment of the present invention includes a valve body containing a flow channel extending through the body from a first primary loop port to a second primary loop port. The valve body also contains first and second secondary loop ports in communication with the flow channel. A flow diversion device is disposed in the valve body to control and alter the flow channel through the various ports of the valve body. The flow diversion device is disposed within the flow channel between the first and second secondary loop ports. The flow diversion device in a first position allows open flow through all ports of the valve. In a second position, the flow diversion device directs flow from the first primary loop port to the first secondary loop port and flow from the second secondary loop port to the second primary loop port.

Embodiments of the present invention provide improvements over historical systems and methods for purging hydronic systems by combining un-obstructive flow pattern of a ball valve and positive shutoff characteristics of a ball valve with fewer connection joints of the purge and fill valve assembly to alleviates the detriments such as internal flow restriction, incomplete shutoff and additional leak paths which are prevalent in the current systems and methods.

An illustrative embodiment of the present invention which is useful in purging hydronic systems provides a purge and fill valve which utilizes three ball valves that are combined into one valve assembly. The valve has a main ball and two valves that communicate from the main valve to an external connection (i.e., drain and fill connections). When the main ball is closed, and the two valves for external communication are opened, the hydronic system can be conveniently and completely emptied and filled from one location. New fluid can be introduced and push out the old fluid, all at one time. The system does not need to be fully emptied and then filled; a two stepped process, rather this is all done in one step.

It should be understood that labeling of "primary" flow path and "secondary" flow path is for illustration purposes and can be reversed without changing the scope of the present invention. For example, the primary flow path could be called the secondary flow path and vice versa. In a typical hydronic system, the primary loop is usually, but not always, associated with a boiler. The closely spaced tees hydraulically separates the primary flow path from the secondary flow path. That is, flow in the primary flow path does not affect flow in the secondary flow path and flow in the secondary flow path does not affect flow in the primary flow path.

In a further illustrative embodiment, where in comparison with the previous embodiment, the "primary" loop is now designated as "secondary," a valve body contains a first primary loop port, a second primary loop port, a first secondary loop port and a second secondary loop port. The secondary loop ports are disposed at respective ends of a linear secondary loop portion of the valve body. A primary loop portion of the valve body is formed by a pair of closely spaced tees extending from the secondary loop portion. At least one main valve portion is disposed in at least one of the tees between the secondary loop portion and a primary loop port. A drain/venting valve portion extends from the main valve portion. A portion of the secondary loop portion between the tees is shared with the primary loop portion in which flow in a primary loop and a secondary loop are hydraulically separated.

People having ordinary skill in the art should appreciate that closely spaced tees are fluid flow path configurations in which two branches from a single flow path in a T shaped arrangement are spaced apart from each other by such that center lines of each of the branches are less than about four times the diameter of the single flow path from which they stem. People having ordinary skill in the art should also appreciate that using closely spaced tees in a closed loop system creates a hydraulic separation where, due to lack of a pressure drop between the tees, a separate flow path is created or maintained through each of the tees.

Another illustrative embodiment of the invention provides a primary/secondary loop purge valve in which a valve body contains a first purge/fill port, a second purge/fill port, a first primary loop port and a second primary loop port. The primary loop ports are disposed at respective ends of a linear secondary loop portion of the valve body. A first purge/fill valve portion and a second purge/fill valve portion are formed in a pair of closely spaced tees extending from the primary loop portion. A main valve portion is disposed in the primary loop portion in alignment with one of the closely spaced tees.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Detailed embodiments of the present invention are disclosed herein, however, it is to be understood that the disclosed embodiments are merely exemplary of the invention, which may be embodied in various forms. Therefore, specific functional or structural details disclosed herein are not to be interpreted as limiting, but merely as a basis for the claims and as a representative basis for teaching one skilled in the art to variously employ the present invention in virtually any appropriately detailed embodiment.

Figure 1:
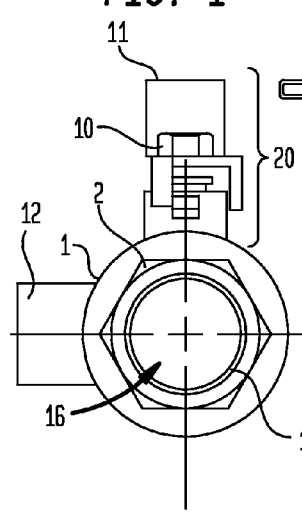
FIG. 1 is an axial view of a first embodiment in accordance with the present invention.

Turning to FIG. 1, an axial view of an embodiment in accordance with the present invention is shown. A valve body 1 defines a flow channel 16 that extends axially through the valve body 1 from a first primary loop port 18 to a second primary loop port. The valve body 1 also defines a first secondary loop port 12 and a second secondary loop port (not shown). An end cap 2 is affixed to the valve body 1 at the first primary loop port 18. An actuator 20 extends from the valve body 1 enabling a first and second position of the valve. The actuator 20 includes a handle 11 affixed to the valve body by a handle nut 10. A flow diversion device (not shown here) is connected to the handle 11. The position of the actuator 20 in a first position configures the flow diversion device to allow flow axially through the entire flow channel 16 from the first primary loop port to the second primary loop flow port as well as through the first and second secondary loop flow ports. In a second position of the actuator 20, the flow diversion device blocks the flow from the first primary loop port 18 to the second primary loop port. In this position, the first primary loop port 18 is in fluid communication with the first secondary loop port 12 only and the second primary loop port is in fluid communication with the second secondary loop port only. In a hydronic piping system, the valve in this position will break the primary loop and force all flow into the secondary loop. This position is used in such systems to purge the secondary loop of air during installation or maintenance.

Figure 2:
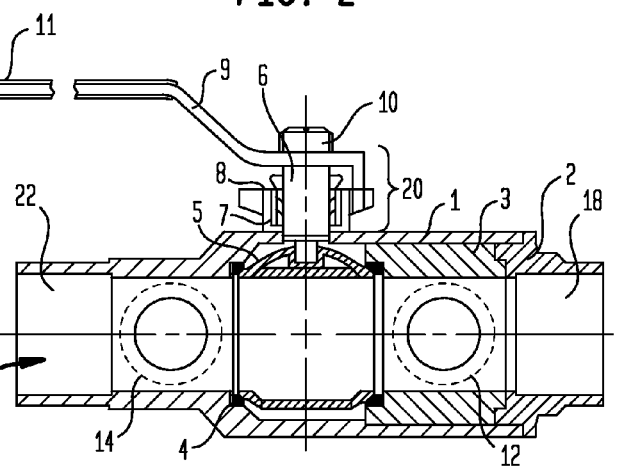
FIG. 2 is a cut-away side view of the first embodiment in accordance with the present invention.
Figure 3:
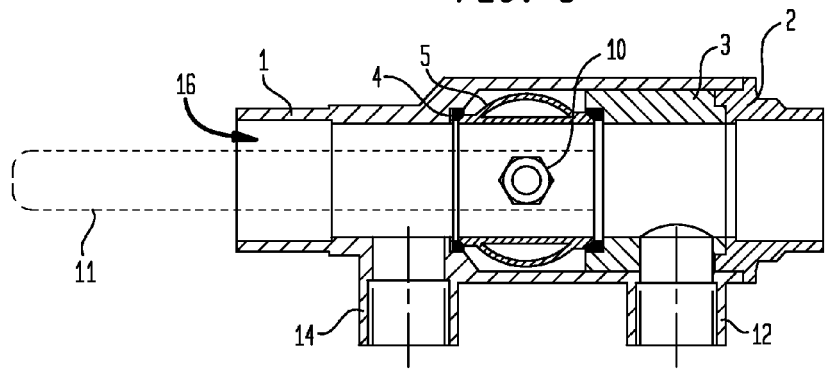
FIG. 3 is a top-down cut-away view of the first embodiment in accordance with the present invention.

Turning now to FIG. 2 and FIG. 3, cut-away views of the first embodiment of the present invention are shown. FIG. 2 depicts the embodiment from a side-view, while FIG. 3 depicts the embodiment from a top-view. A valve body 1 defines a flow channel 16 axially though the valve from the first primary loop port 18 to the second primary loop port 22. The first secondary loop port 12 and the second secondary loop port 14 are also in fluid communication with the flow channel 16. The end cap 2 is disposed into the valve body 1 and mated with a seat retainer 3. The actuator 20 extends from the valve body 1 containing a stem 6, a stem seal 7 and a packing gland 8. The actuator 20 also includes a handle 11 that is affixed to the stem 6 with the handle nut 10. The actuator 20 repositions the flow diversion device 5 to alter the flow channels of the valve. The flow diversion device 5 is disposed within the valve body 1 in between the first secondary loop port 12 and the second secondary loop port 14. The flow diversion device in this embodiment includes a ball defining two openings equal in diameter to the diameter of the flow channel 16. The flow diversion device 5 is disposed between valve seats 4. The position of the actuator 20 in a first position positions the flow diversion device to allow flow axially through the entire flow channel 16 from the first primary loop port to the second primary loop port as well as through the first and second secondary loop ports. In a second position of the actuator 20, the flow diversion device blocks the flow from the first primary port 18 to the second primary port. In this position, the first primary loop port 18 is in fluid communication with the first secondary loop port 12 only and the second primary loop port is in fluid communication with the second secondary loop port only.

Figure 4:
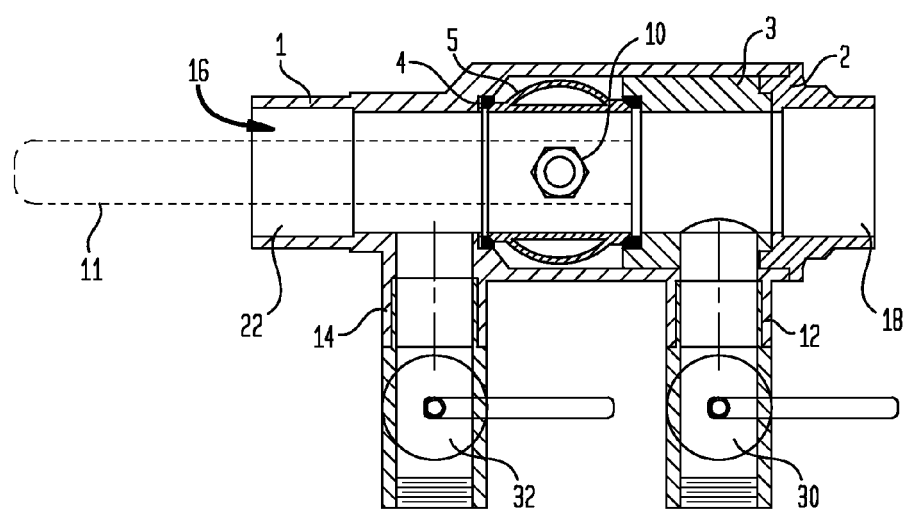
FIG. 4 is a top-down cut-away view of a second embodiment having a flow diversion device disposed within the first and second secondary loop ports.

An alternative embodiment of the present invention is described with reference to FIG. 4 which is similar to the embodiment shown in FIG. 3 but also includes a flow diversion device disposed within each of the first and second secondary loop ports 12, 14. A valve body 1 defines a flow channel 16 axially though the valve from the first primary loop port 18 to the second primary loop port 22. The first secondary loop port 12 and the second secondary loop port 14 are also in fluid communication with the flow channel 16. A first secondary flow diversion device 30 is disposed within the first secondary loop port and is configurable to a first position which closes the first secondary loop port and to a second position which opens the first secondary loop port. A second secondary flow diversion device 32 is disposed within the second secondary loop port and is configurable to a first position which closes the second secondary loop port and to a second position which opens the second secondary loop port.

Figure 5:
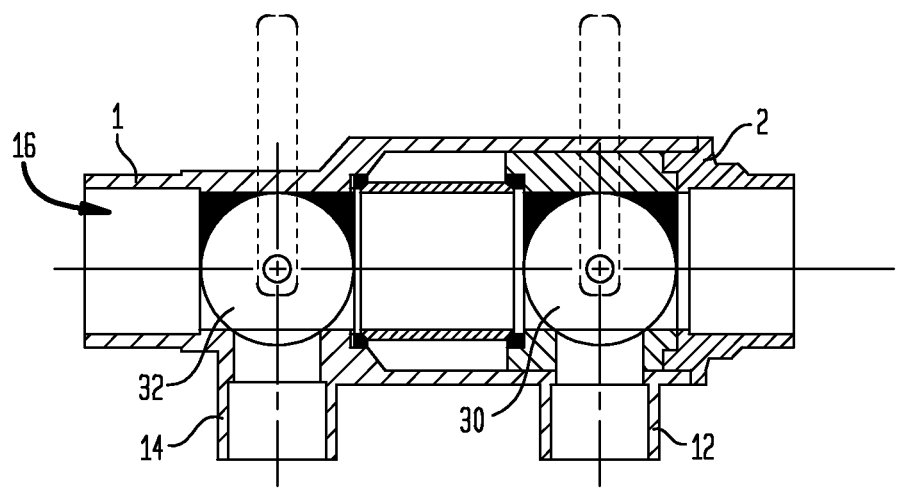
FIG. 5 is a top-down cut-away view of a third embodiment having multiple flow diversion devices disposed within the primary loop.

In a still further alternative embodiment illustrated in FIG. 5 the primary/secondary loop valve includes multiple valves in the primary loop to effect flow in the primary and secondary loops. The multiple flow diversion devices, 30, 32 are disposed in the primary flow channel 16 at the intersections of the primary and secondary flow paths. The flow diversion devices are configured, as described hereinbefore, to alternately provide flow through at least one of the primary and secondary loops.

The present invention also provides a method of purging a primary loop in a primary/secondary plumbing system using the inventive loop purge valve by connecting the first secondary loop port to a flushing fluid source and actuating the primary flow diversion device to configure the primary flow diversion device in its second position to close the flow path between the first primary loop port and second primary loop port. The first secondary flow diversion device is configured in the second position to allow the flushing fluid to flow into the first secondary loop port and the second secondary flow diversion device is configured in the second position to allow the flushing fluid to flow out from the second secondary loop port after flowing through the secondary loop (complete loop not shown). Upon completion of the purging procedure, each of the flow diversion devices can be configured to their respective first positions.

Although one illustrative embodiment described herein includes diversion devices in both of the secondary loop ports and in the primary loop path, one skilled in the art should appreciate that other configurations of diversion devices can be implemented, such as a diversion device in each of the first and second primary loop ports, or in other combinations, such as a diversion device at inputs and/or outputs of the loop ports (primary and/or secondary).

Figure 6:
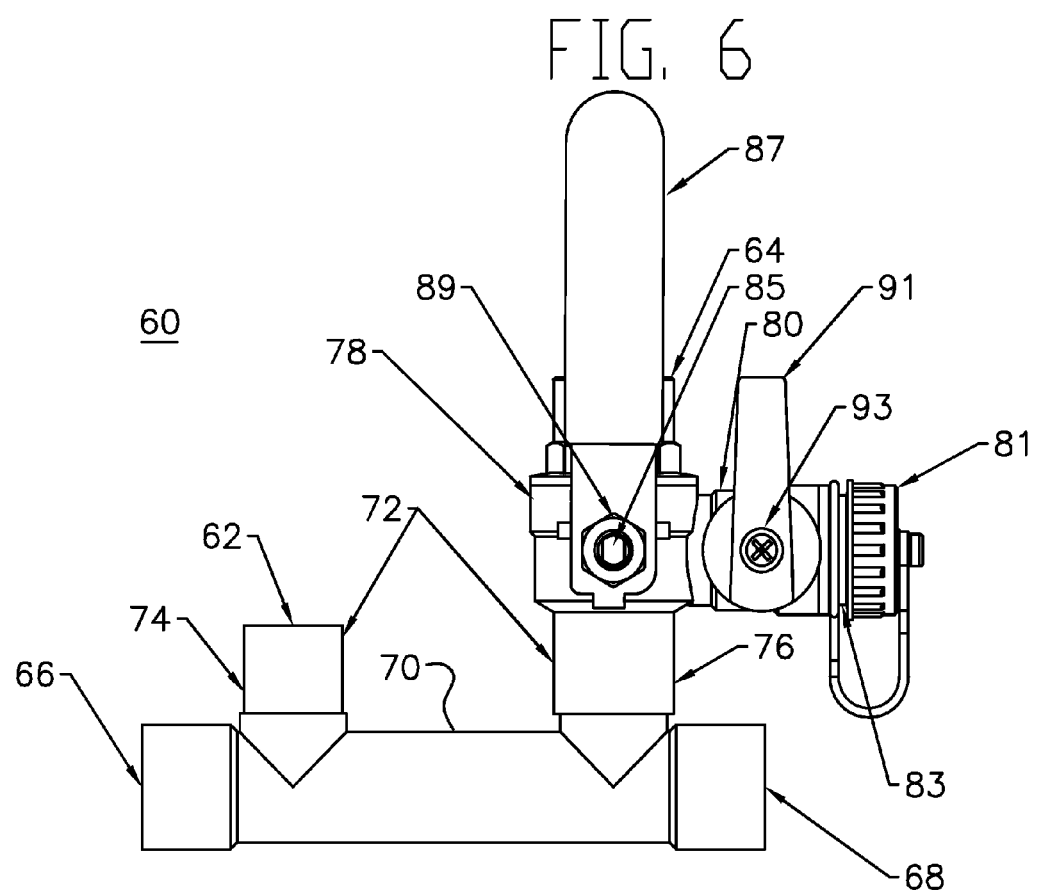
FIG. 6 is a plan view of a primary/secondary loop purge valve in normal operating position according to a fourth illustrative embodiment of the invention.

FIG. 6 is a plan view of a primary/secondary loop purge valve in normal operating position according to a fourth illustrative embodiment of the invention. The embodiment includes a valve body 60 containing a first primary loop port 62, a second primary loop port 64, a first secondary loop port 66 and a second secondary loop port 68. The secondary loop ports 66, 68 are disposed at respective ends of a linear secondary loop portion 70 of the valve body 60. A primary loop portion 72 of the valve body 60 is formed by a pair of "closely" spaced tees 74, 76 extending from the secondary loop portion 70. At least one main valve portion 78 is disposed in at least one of the tees 76 between the secondary loop portion 70 and a primary loop port 64. A drain/venting valve portion 80 extends from the main valve portion 78. An end cap 81 is affixed to the valve body 60 at a drain port 83 of the drain/venting valve portion 80. A portion of the secondary loop portion 70 between the tees 74, 76 is shared with the primary loop portion in which flow in a primary loop and a secondary loop are "hydraulically separated."

A main actuator 85 extends from the valve body 60 enabling a first and second position of the main valve portion 78. A main flow diversion device (not shown here) is connected to a main handle 87 via the main actuator 85. The main handle 87 is retained to the main actuator with a nut 89. A purge valve handle 91 is connected to a purge valve flow diversion device (not shown here) via a purge valve actuator (not shown here). The purge valve handle 91 is retained to the purge valve actuator by a screw 93.

Figure 7:
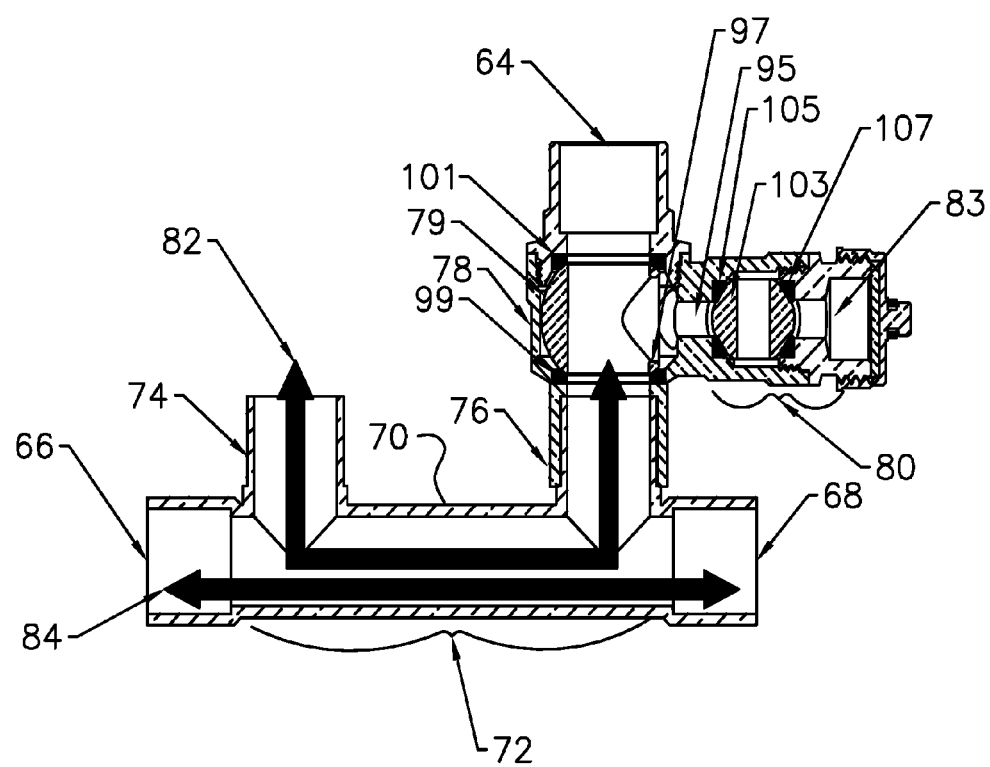
FIG. 7 is a section view of the primary/secondary loop purge valve in normal operating position according to the fourth illustrative embodiment of the invention.

FIG. 7 is a sectioned view of the primary/secondary loop purge valve in normal operating position according to the fourth illustrative embodiment of the invention. A primary loop fluid flow path 82 is shown by arrows extending into tee 74, through the secondary loop portion 70 and into tee 76. Fluid can flow in either direction along the primary loop fluid flow path 82. A secondary loop flow path 84 is shown by arrows extending into the first secondary loop port 66 through the secondary loop portion 70 and out from the second secondary loop port 68. It should be understood that a common flow of both the primary loop flow path 82 and the secondary loop flow path 84 exists in the secondary loop portion 70.

The main valve portion 78 is shown in the normal operation position in which fluid in the primary fluid flow path 82 can flow from secondary loop portion 70 through the main valve portion 78 to the primary loop port 64. The main flow diversion device 79 in the main valve portion 78 is shown in a first position to enable flow in the primary flow path between tee 76 and the second primary loop port 64 while preventing flow to the drain/venting valve portion 80. In this illustrative embodiment, the main flow diversion device 79 is a first ball having a through hole 95 extending through its center and a blind hole 97 extending orthogonal to the through hole to its center. The first ball is rotatable on an axis of the main actuator 85 (FIG. 7) by movement of handle 87 (best seen in FIG. 6) and main actuator 85 (FIG. 7). The first ball forms a seal with sealing portions 99 and 101.

The purge valve flow diversion device 103 in the drain/venting valve portion 80 is shown in its normally closed position in which fluid in the primary flow path 82 is prevented from flowing between the main valve portion 78 and the drain port 83. In this illustrative embodiment, the purge valve flow diversion device 103 is a second ball having a through hole extending through its center. The second ball is rotatable on an axis of the purge valve actuator (not shown) which extends through its center and normal to the plane of drawing in FIG. 7 by movement of purge valve handle 91 (best seen in FIG. 6) and the purge valve actuator retained thereto (not shown) by screw 93. The second ball forms a seal with sealing portions 105 and 107.

Figure 8:
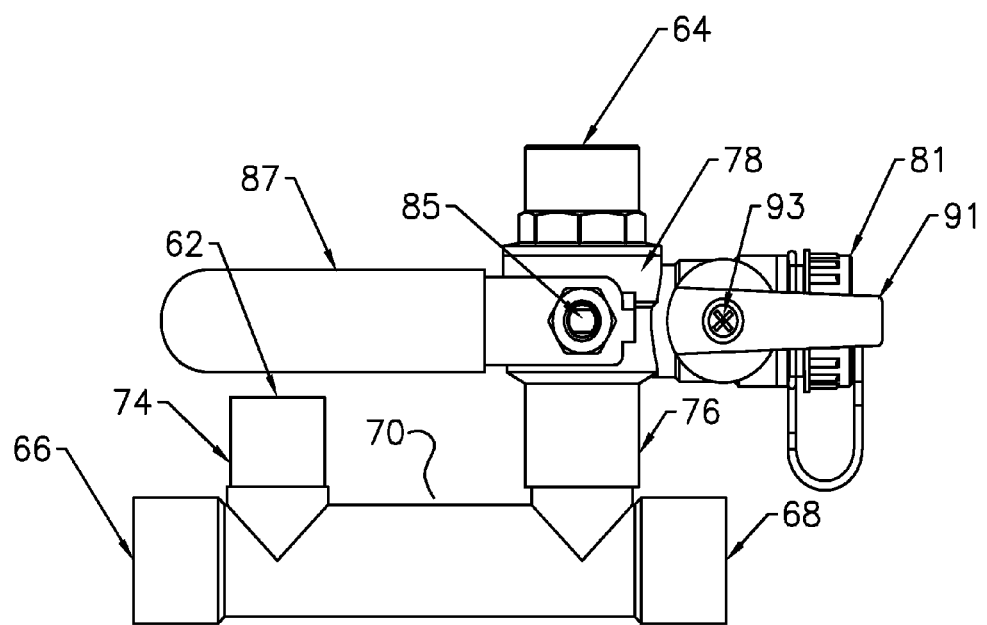
FIG. 8 is a plan view of the primary/secondary loop purge valve in a purging position according to the fourth illustrative embodiment of the invention.

FIG. 8 is a plan view of the primary/secondary loop purge valve in a purge/drain position according to the fourth illustrative embodiment of the invention. The main valve handle 87 and main actuator 85 are rotated 90 degrees counter clockwise relative to their normal operating position. The purge valve handle 91 is rotated 90 degrees clockwise relative to its normally closed position.

Figure 9:
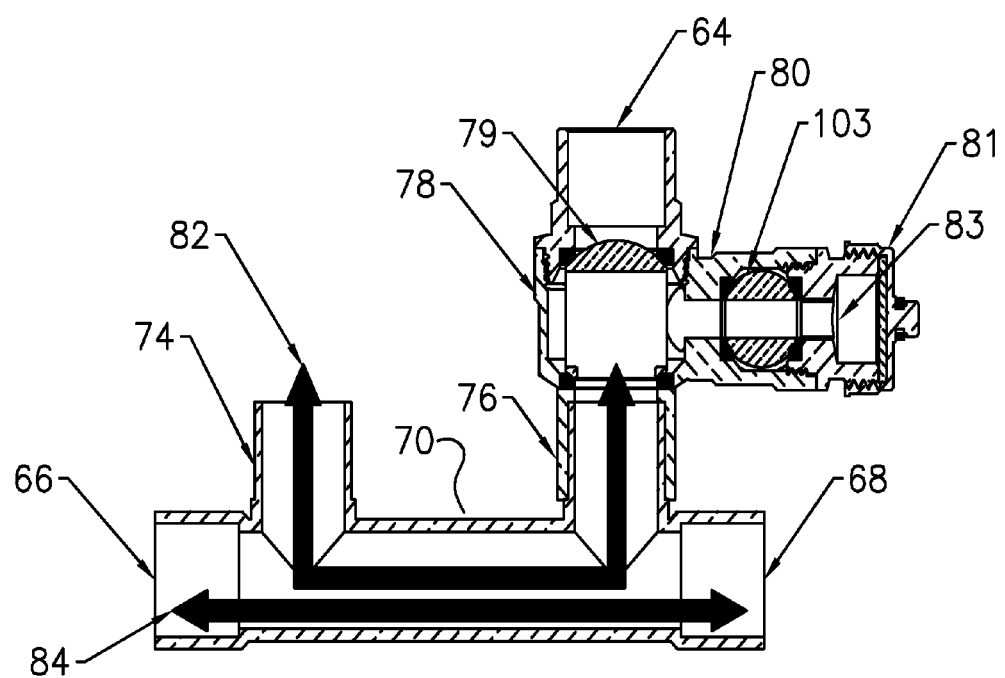
FIG. 9 is a section view of the primary/secondary loop purge valve in purging position according to the fourth illustrative embodiment of the invention.

FIG. 9 is a section view of the primary/secondary loop purge valve in a purge/drain position according to the fourth illustrative embodiment of the invention. The primary loop fluid flow path 82 is shown by arrows extending into tee 74, through the secondary loop portion 70 and into tee 76. Fluid in the primary flow path flows into main valve portion 78 where it is diverted by the main flow diversion device 79 into the drain/venting valve portion 80. Because the purge valve handle is in the purge/drain position, fluid entering the drain/venting valve portion 80 can flow through the purge valve flow diversion device 103 to the drain port 83. Protective cap 81 can be removed to vent or drain the system via the primary flow path 82.

Again, it should be understood that labeling of "primary" flow path and "secondary" flow path is for illustration purposes and can be reversed without changing the scope of the present invention. For example, the primary flow path could be called the secondary flow path and vice versa. In a typical hydronic system, the primary loop is usually, but not always, associated with a boiler. The closely spaced tees hydraulically separates the primary flow path from the secondary flow path. That is, flow in the primary flow path does not affect flow in the secondary flow path and flow in the secondary flow path does not affect flow in the primary flow path.

In normal operating position of valve body 60, the affect of closely spaced tees 74,76 and main valve portion 78 in the normal operating position is to hydraulically separate the primary flow path 82 from the secondary flow path 84.

In a second configuration, the main valve portion 78 closes off the primary flow path 82 and the drain/venting valve portion 80 is opened. The flow from the primary flow path 82 goes into a flow passageway, secondary loop portion 70, that is shared with the secondary flow path 84, then back to the primary flow path 82. Because the main valve portion is "closed", i.e. in its second configuration, and the drain/venting valve portion 80 is open, for example any trapped air is purged out of the system. Once the trapped air has been purged out of the system, the main valve portion 78 and the drain/venting valve portion 80 are returned to their normal operating positions.

Hydronic systems that use the primary/secondary piping method typically have circulation pumps installed in each loop. The circulation pump forces the fluid through the loop until the fluid encounters an obstacle, such as a shut valve. By providing a new path for the fluid to flow (e.g., out of the drain/venting valve portion 80) the fluid can continue to flow. Upon commissioning a piping system, or performing maintenance on a system, air is tapped inside the piping system. By power pumping when the main valve portion 78 and drain venting valve portion 80 are in the drain/purge configuration, air is power purged from the system via the drain port 83.

It should be appreciated that the flow directions in the primary flow path 82 and the secondary flow path 84 can be reversed within the scope of the present invention. In such cases, the main flow diversion device 79 is oriented 180 degrees relative to the orientation shown so that the closed portion is located downstream, i.e. toward the lower portion of main valve portion 79 when the primary flow path is oriented from the second primary loop port 64 toward tee 76.

Figure 10:
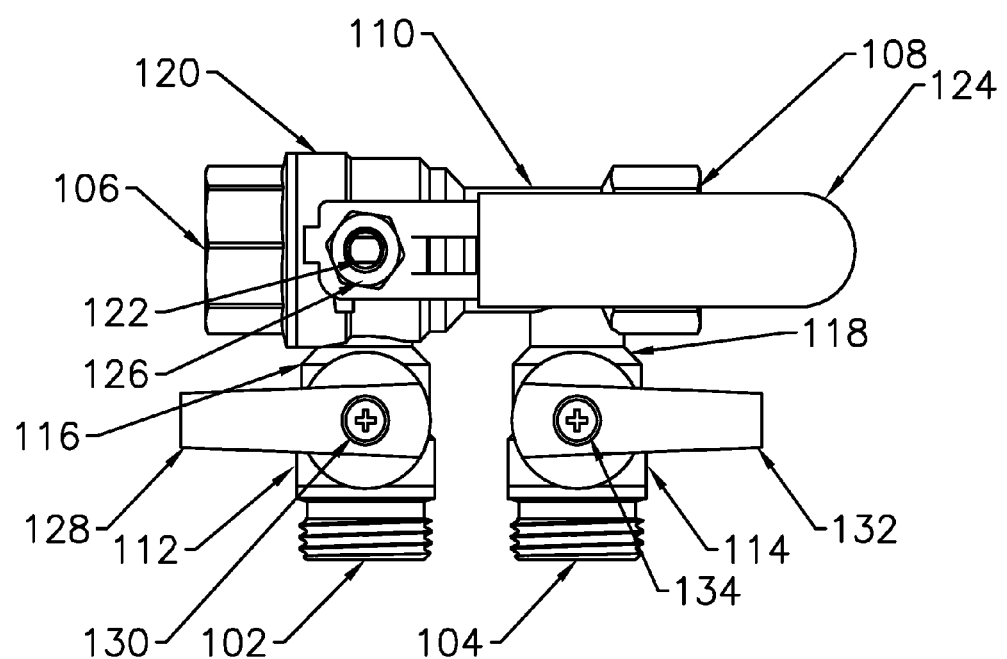
FIG. 10 is a plan view of a primary/secondary loop purge valve in normal operating position according to a fifth illustrative embodiment of the invention.

FIG. 10 is a plan view of a primary/secondary loop purge valve in normal operating position according to a fifth illustrative embodiment of the invention. The embodiment includes a valve body 100 containing a first purge/fill port 102, a second purge/fill port 104, a first primary loop port 106 and a second primary loop port 108. The primary loop ports 106, 108 are disposed at respective ends of a linear primary loop portion 110 of the valve body 100. A first purge/fill valve portion 112 and a second purge/fill valve portion 114 are formed in a pair of closely spaced tees 116, 118 extending from the primary loop portion 110. Persons having ordinary skill in the art should appreciate that the closely spaced tees 116, 118 provide hydraulic separation in the primary loop portion 110 between the first purge/fill valve portion 112 and the second purge/fill valve portion 114. A main valve portion 120 is disposed in the primary loop portion 110 in alignment with one of the closely spaced tees 116.

A main actuator 122 extends from the valve body 100 enabling a first and second position of the main valve portion 120. A main flow diversion device (not shown here) is connected to a main handle 124 via the main actuator 122. The main handle 124 is retained to the main actuator with a nut 126. A first purge/fill valve handle 128 is connected to a first purge/fill valve flow diversion device (not shown here) via a first purge/fill valve actuator (not shown here). The first purge/fill valve handle 128 is retained to the purge/fill valve actuator by a screw 130. A second purge/fill valve handle 132 is connected to a second purge/fill valve flow diversion device (not shown here) via a second purge/fill valve actuator (not shown here). The second purge/fill valve handle 132 is retained to the second purge/fill valve actuator by a screw 134.

Figure 11:
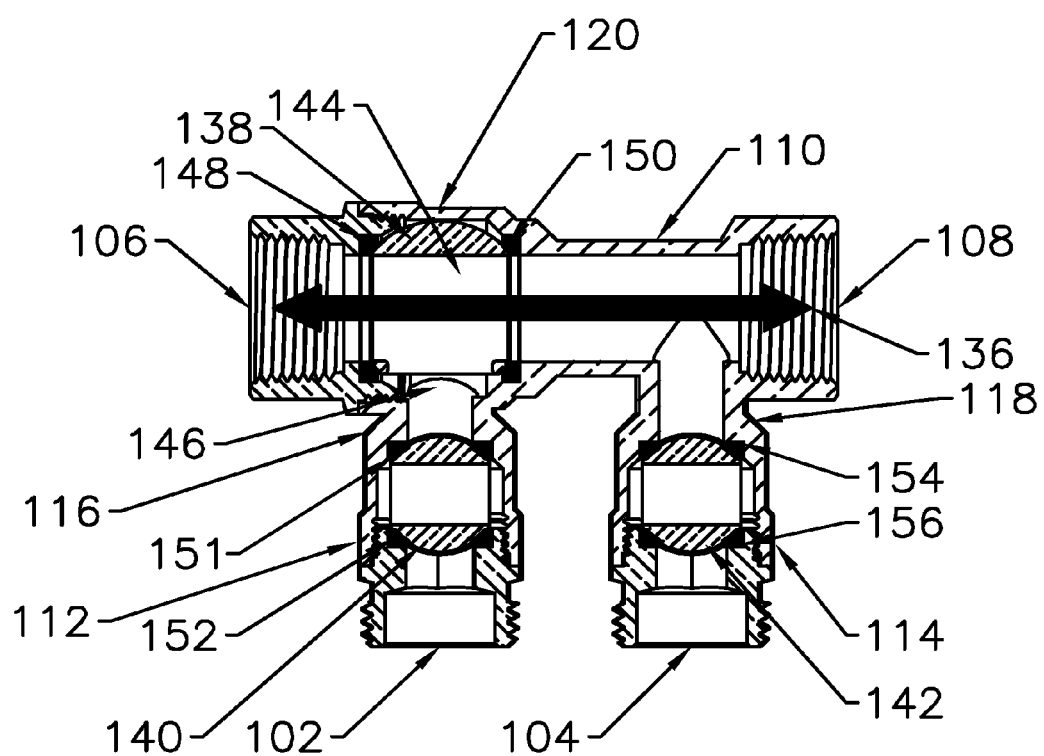
FIG. 11 is a section view of the primary/secondary loop purge valve in normal operating position according to the fifth illustrative embodiment of the invention.

FIG. 11 is a section view of the primary/secondary loop purge valve in normal operating position according to the fifth illustrative embodiment of the invention. A primary loop fluid flow path 136 is shown by arrows extending through the primary loop portion 110. In the configuration shown in FIG. 11, fluid can flow in either direction along the primary loop fluid flow path 136.

The main valve portion 120 is shown in the normal operation position in which fluid in the primary fluid flow path 136 can flow between the first primary loop port 106 and the second primary loop port 108 via the main valve portion 120. The main flow diversion device 138 in the main valve portion 120 is shown in a first position to enable flow in the primary flow path. The first purge/drain flow diversion device 140 and second purge/drain flow diversion device 142 are shown in a first position to prevent flow from the primary flow path to either the first purge/drain port 102 or the second purge/drain port 104. In this illustrative embodiment, the main flow diversion device 138 is a first ball having a through hole 144 extending through its center and a blind hole 146 extending orthogonal to the through hole to its center. The first ball is rotatable on an axis of the main actuator 122 (FIG. 10) by movement of handle 124 and main actuator 122 (FIG. 10). The first ball forms a seal with sealing portions 148 and 150.

The first purge/fill valve flow diversion device 140 in the first purge/fill valve portion 112 is shown in its normally closed position in which fluid in the primary flow path 136 is prevented from flowing between the main valve portion 120 and the first purge/fill port 102. In this illustrative embodiment, the first purge/fill valve flow diversion device 140 is a second ball having a through hole extending through its center. The second ball is rotatable on an axis of the first purge/fill valve actuator (not shown) which extends through its center and normal to the plane of drawing in FIG. 11 by movement of first purge/fill valve handle 128 (FIG. 10) and the first purge valve actuator retained thereto (not shown) by screw 130 (FIG. 10). The second ball forms a seal with sealing portions 151 and 152.

The second purge/fill valve flow diversion device 142 in the second purge/fill valve portion 114 is shown in its normally closed position in which fluid in the primary flow path 136 is prevented from flowing between the primary loop portion 110 and the second purge/fill port 104. In this illustrative embodiment, the second purge/fill valve flow diversion device 142 is a third ball having a through hole extending through its center. The third ball is rotatable on an axis of the second purge/fill valve actuator (not shown) which extends through its center and normal to the plane of drawing in FIG. 11 by movement of second purge/fill valve handle 132 (FIG. 10) and the first purge valve actuator retained thereto (not shown) by screw 134 (FIG. 10). The second ball forms a seal with sealing portions 154 and 156.

Figure 12:
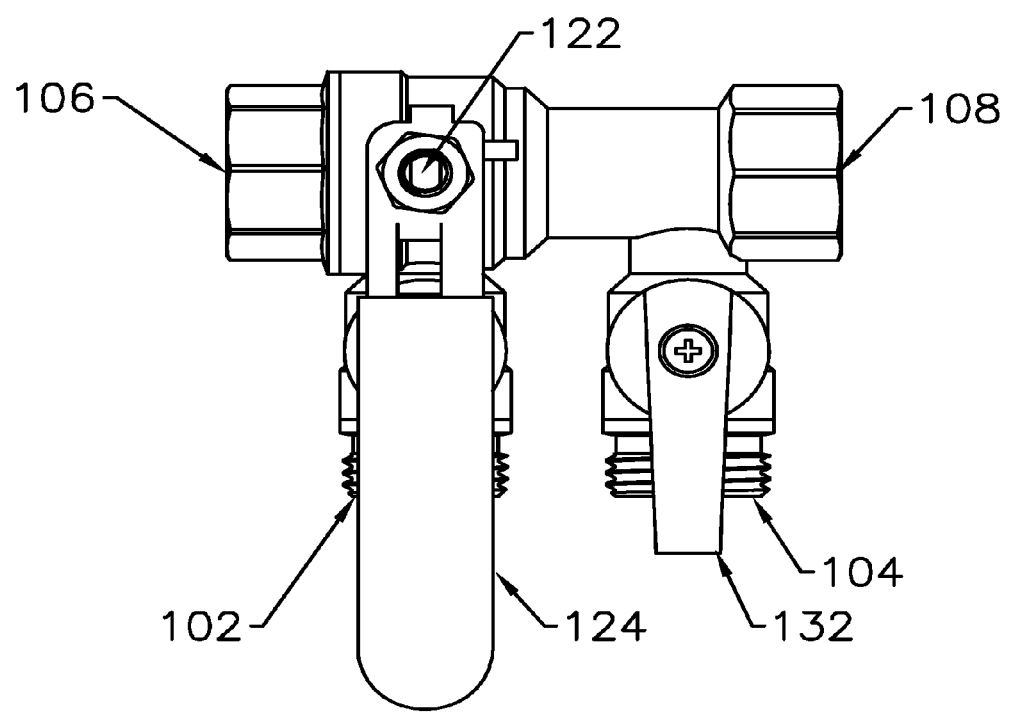
FIG. 12 is a plan view of the primary/secondary loop purge valve in a purging position according to the fifth illustrative embodiment of the invention.

FIG. 12 is a plan view of the primary/secondary loop purge valve in a purging position according to the fifth illustrative embodiment of the invention. The main valve handle 124 and main actuator 122 are rotated 90 degrees counter clockwise relative to their normal operating position. The first purge/fill valve handle 128 is rotated 90 degrees clockwise relative to its normally closed position and is obscured in this view by the main valve handle 124. The second purge/fill valve handle 132 is rotated 90 degrees counter-clockwise relative to its normally closed position.

Figure 13:
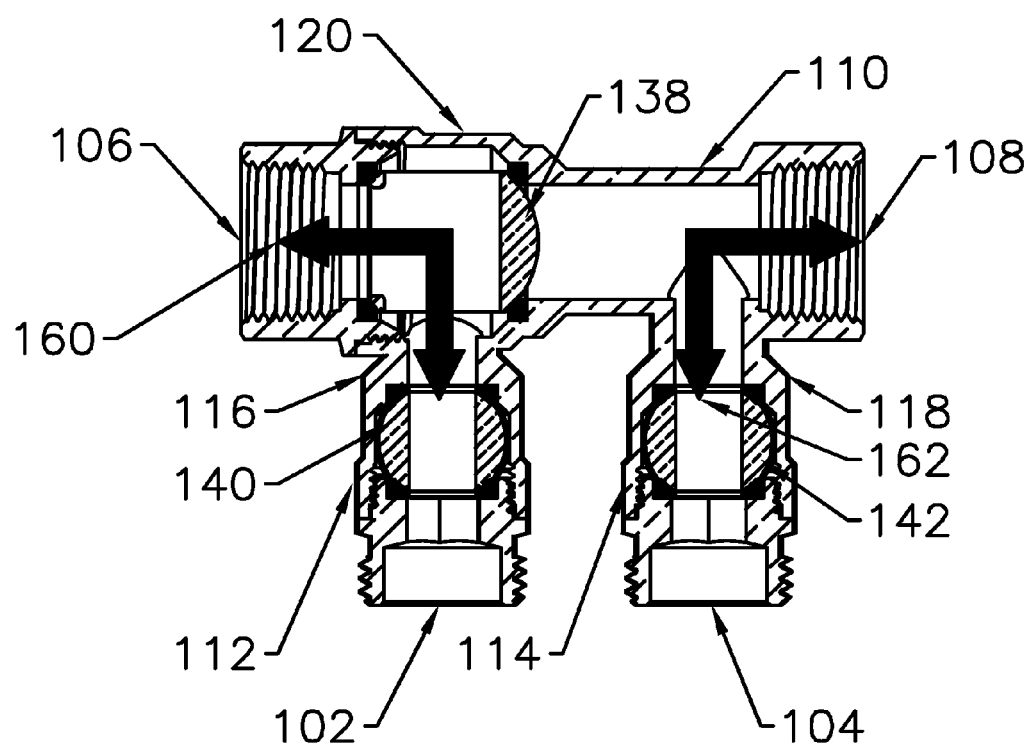
FIG. 13 is a section view of the primary/secondary loop purge valve in purging position according to the fifth illustrative embodiment of the invention.

FIG. 13 is a section view of the primary/secondary loop purge valve in purging position according to the fifth illustrative embodiment of the invention. A first purge/fill loop flow path 160 is shown by arrows extending between primary loop port 106 and tee 116. Fluid in the first purge/fill loop flow path 160 can flow through main valve portion 120 where it is diverted by the main flow diversion device 138 into the first purge/fill valve portion 112. Because the first purge/fill valve handle 128 (best seen in FIG. 10) is in the purge/fill position, fluid entering the first purge/fill valve portion 112 can flow through the first purge/fill flow diversion device 140 to the first purge/fill port 102.

A second purge/fill loop flow path 162 is shown by arrows extending between primary loop port 108 and tee 118. Fluid in the second purge/fill loop flow path 162 can not flow through main valve portion 120 because it is diverted by the main flow diversion device 138. Because the second purge/fill valve handle 132 (best seen in FIG. 12) is in the purge/fill position, fluid entering the second purge/fill valve portion 114 from primary loop port 108 can flow through the second purge/fill flow diversion device 142 to the second purge/fill port 104.

It should also be appreciated that a "diversion device" can be one or more devices for diverting flow in a desired manner.

The descriptions of flow paths and flow directions herein which identify flow paths or other elements with labels such as primary and secondary, or first and second are for illustrative purposes to provide labels for a particular embodiment, drawing or claim and are not indicative of a hierarchal relationship between the elements. Further it should be understood that such labels may be reversed in any of the embodiments described or claimed herein without affecting the scope of the present disclosure. Similarly, it should be understood that the clockwise or counterclockwise direction of rotations of certain elements such as flow diversion devices and handles described herein are for illustrative purposes only and may generally be reversed without changing the scope of the present disclosure.

While the invention has been described with reference to illustrative embodiments, it will be understood by those skilled in the art that various other changes, omissions and/or additions may be made and substantial equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A purge valve comprising:
a valve body having a linear primary loop portion having an inner diameter, first and second primary loop ports disposed at respective ends of said primary loop portion, first and second tees extending from said primary loop portion, and first and second purge/fill valve portions disposed in said first and second tees, respectively, said first purge/fill valve portion having a first purge/fill port disposed on an end thereof and said second purge/fill valve portion having a second purge/fill port disposed on an end thereof;
said first purge/fill valve portion disposed between said primary loop portion and said first purge/fill port and said second purge/fill valve portion disposed in said second tee between said primary loop portion and said second purge/fill port;
said first and second tees having centerlines being spaced apart from each other by a distance less than four times said inner diameter of said linear primary loop portion, thereby allowing hydraulic separation of a flow in the primary loop portion and a flow in the first and second purge/fill portions;
a main valve portion disposed in said primary loop portion in alignment with said first tee, said main valve portion having a first position and a second position, said first position adapted to open a flow path without obstruction between said first primary loop port, said second primary loop port, and said first tee, and said second position adapted to close a flow path between said first primary loop port and said second primary loop port and open a flow path between said first primary loop port and said first tee;
a main actuator extending from said valve body in said main valve portion and enabling said first and second positions of said main valve portion; and
a main flow diversion device connected to a main handle via said main actuator, said main flow diversion device including a main ball portion having a through hole extending centrally there-through and a blind hole extending orthogonally to said through hole from a center of said main ball portion, said main ball portion being rotatable about an axis through said center and normal to a plane of said through hole and said blind hole, said through hole in axial alignment with said linear primary loop portion and said blind hole in axial alignment with said first purge/fill valve portion when said main valve portion is in said first position.

2. The purge valve of claim 1, comprising:
a first purge/fill valve actuator extending from said first purge/fill valve portion and enabling a first and a second position of said first purge/fill valve portion; and
a second purge/fill valve actuator extending from said second purge/fill valve portion and enabling a first and a second position of said second purge/fill valve portion.

3. The purge valve of claim 2, comprising:
a first purge/fill valve flow diversion device connected to a first purge/fill valve handle via said first purge/fill valve actuator; and
a second purge/fill valve flow diversion device connected to a second purge/fill valve handle via said second purge/fill valve actuator.

4. The purge valve of claim 3, wherein said first purge/fill valve flow diversion device or said second purge/fill valve flow diversion device comprises a second ball portion having a through hole extending there-through and being rotatable about a central axis normal to a plane of said through hole.

5. The purge valve of claim 1, wherein said spacing between said centerlines of said first and second tees is configured to create and maintain a separate flow path through each of said first and second purge/fill valve portions.

6. The purge valve of claim 1, wherein at said first position, said main valve portion provides a path between said first primary loop port and said second primary loop port and a path between said first primary loop port and said first tee, said paths being equal in diameter to said inner diameter of said linear primary loop portion.

* * * * *